(12) United States Patent
Brower, Jr. et al.

(10) Patent No.: US 8,799,051 B2
(45) Date of Patent: *Aug. 5, 2014

(54) SYSTEM AND METHOD FOR AUTOMATING CUSTOMER-VALIDATED STATEMENT OF WORK FOR A DATA STORAGE ENVIRONMENT

(71) Applicant: CommVault Systems, Inc., Oceanport, NJ (US)

(72) Inventors: Robert Keith Brower, Jr., Midlothian, VA (US); Peter Messore, Manahawkin, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,391

(22) Filed: Apr. 1, 2013

(65) Prior Publication Data
US 2013/0218629 A1 Aug. 22, 2013

Related U.S. Application Data

(63) Continuation of application No. 13/608,931, filed on Sep. 10, 2012, now Pat. No. 8,428,995, which is a continuation of application No. 12/044,261, filed on Mar. 7, 2008, now Pat. No. 8,290,808.

(60) Provisional application No. 60/906,177, filed on Mar. 9, 2007.

(51) Int. Cl.
*G06Q 10/00* (2012.01)

(52) U.S. Cl.
USPC ........................................................ 705/7.27

(58) Field of Classification Search
USPC ........................................................ 705/7.27
See application file for complete search history.

(56) References Cited

U.S. PATENT DOCUMENTS 4,296,465 A 10/1981 Lemak
(Continued)

FOREIGN PATENT DOCUMENTS

AU 2006331932 12/2006
(Continued)

OTHER PUBLICATIONS

Vipul Kashyap, Siddhartha Dalai and Cliff Behrens. "Professional Services Automation: A Knowledge Management Approach using LSI and Domain Specific Ontologies" FLAIRS-01 Proceedings. Copyright 2001,American Association for Artificial Inlelligence.*

(Continued)

*Primary Examiner* — Brett Feeney
*Assistant Examiner* — George H Walker
(74) *Attorney, Agent, or Firm* — Knobbe Martens Olson & Bear LLP

(57) ABSTRACT

Computer systems and methods are disclosed for improving professional services delivery, such as services in a data management environment. In certain examples, computer systems comprise portals for transmitting and receiving information from parties involved in the performance and receipt of professional services. For instance, a first portal can receive data (e.g., from sales personnel) descriptive of a customer's product environment. A manager module populates a record with the data, and a second portal provides the customer with access to the record for review, correction and/or validation prior to the generation of a Statement of Work or other like project description. The second portal can also request additional information from the customer regarding the product environment. The manager module compares the data received through the first portal with the customer-entered information to identify and/or address discrepancies between the sets of data and customize the generation of the Statement of Work.

14 Claims, 8 Drawing Sheets

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,067,525 A * | 5/2000 | Johnson et al. ............... 705/7.13 |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A * | 12/2000 | Tibbetts ........................ 717/100 |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Amangau |
| 6,473,775 B1 | 10/2002 | Kusters et al. |
| 6,487,561 B1 | 11/2002 | Ofek et al. |

(56) References Cited

U.S. PATENT DOCUMENTS

| | | |
|---|---|---|
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 * | 6/2005 | Kaiser ..................... 702/186 |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 * | 10/2005 | Knoblock et al. ............... 1/1 |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,473 B2 * | 2/2006 | Curtis et al. ............... 705/7.29 |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,086,787 B2 | 8/2006 | Okada et al. |
| 7,092,968 B1 * | 8/2006 | Ebel et al. ............... 1/1 |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 * | 9/2007 | Powers et al. ................. 709/221 |
| 7,272,606 B2 | 9/2007 | Borthakur et al. |
| 7,275,138 B2 | 9/2007 | Saika |
| 7,275,177 B2 | 9/2007 | Armangau et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,389,311 B1 | 6/2008 | Crescenti et al. |
| 7,392,360 B1 * | 6/2008 | Aharoni et al. ............... 711/170 |
| 7,395,282 B1 | 7/2008 | Crescenti et al. |
| 7,409,509 B2 | 8/2008 | Devassy et al. |
| 7,415,488 B1 | 8/2008 | Muth et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,467,167 B2 | 12/2008 | Patterson |
| 7,467,267 B1 | 12/2008 | Mayock |
| 7,472,238 B1 | 12/2008 | Gokhale |
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 * | 4/2009 | Johnson et al. ............... 705/16 |
| 7,519,726 B2 | 4/2009 | Palliyll et al. |
| 7,529,748 B2 | 5/2009 | Wen et al. |
| 7,529,782 B2 | 5/2009 | Prahlad et al. |
| 7,532,340 B2 | 5/2009 | Koppich et al. |
| 7,536,291 B1 | 5/2009 | Retnamma et al. |
| 7,539,707 B2 | 5/2009 | Prahlad et al. |
| 7,539,835 B2 * | 5/2009 | Kaiser ............... 711/170 |
| 7,543,125 B2 | 6/2009 | Gokhale |
| 7,546,324 B2 | 6/2009 | Prahlad et al. |
| 7,565,572 B2 | 7/2009 | Yamasaki |
| 7,596,586 B2 | 9/2009 | Gokhale et al. |
| 7,606,841 B1 | 10/2009 | Ranade |
| 7,606,844 B2 | 10/2009 | Kottomtharayil |

(56) References Cited

U.S. PATENT DOCUMENTS

| | | | |
|---|---|---|---|
| 7,613,748 B2 | 11/2009 | Brockway et al. | |
| 7,613,750 B2 | 11/2009 | Valiyaparambil et al. | |
| 7,617,253 B2 | 11/2009 | Prahlad et al. | |
| 7,617,262 B2 | 11/2009 | Prahlad et al. | |
| 7,617,541 B2 | 11/2009 | Plotkin et al. | |
| 7,627,598 B1 | 12/2009 | Burke | |
| 7,627,617 B2 | 12/2009 | Kavuri et al. | |
| 7,636,743 B2 | 12/2009 | Erofeev | |
| 7,651,593 B2 | 1/2010 | Prahlad et al. | |
| 7,661,028 B2 | 2/2010 | Erofeev | |
| 7,668,798 B2 | 2/2010 | Scanlon et al. | |
| 7,669,029 B1* | 2/2010 | Mishra et al. | 711/170 |
| 7,685,126 B2 | 3/2010 | Patel et al. | |
| 7,689,467 B1* | 3/2010 | Belanger et al. | 705/26.8 |
| 7,702,533 B2* | 4/2010 | Barnard et al. | 705/7.38 |
| 7,716,171 B2 | 5/2010 | Kryger | |
| 7,734,715 B2 | 6/2010 | Hyakutake et al. | |
| 7,739,235 B2 | 6/2010 | Rousseau et al. | |
| 7,810,067 B2* | 10/2010 | Kaelicke et al. | 717/102 |
| 7,840,533 B2 | 11/2010 | Prahlad et al. | |
| 7,840,537 B2 | 11/2010 | Gokhale et al. | |
| 7,870,355 B2 | 1/2011 | Erofeev | |
| 7,930,476 B1* | 4/2011 | Castelli et al. | 711/114 |
| 7,962,455 B2 | 6/2011 | Erofeev | |
| 7,962,709 B2 | 6/2011 | Agrawal | |
| 8,009,820 B2* | 8/2011 | Curtis | 379/221.02 |
| 8,024,294 B2 | 9/2011 | Kottomtharayil | |
| 8,121,983 B2 | 2/2012 | Prahlad et al. | |
| 8,166,263 B2 | 4/2012 | Prahlad | |
| 8,195,623 B2 | 6/2012 | Prahlad et al. | |
| 8,204,859 B2 | 6/2012 | Ngo | |
| 8,219,524 B2 | 7/2012 | Gokhale | |
| 8,271,830 B2 | 9/2012 | Erofeev | |
| 8,290,808 B2 | 10/2012 | Brower, Jr. et al. | |
| 8,428,995 B2 | 4/2013 | Brower, Jr. et al. | |
| 2001/0029517 A1 | 10/2001 | De Meno et al. | |
| 2001/0032172 A1* | 10/2001 | Moulinet et al. | 705/37 |
| 2001/0035866 A1 | 11/2001 | Finger et al. | |
| 2001/0042222 A1 | 11/2001 | Kedem et al. | |
| 2001/0044807 A1 | 11/2001 | Kleiman et al. | |
| 2002/0002557 A1 | 1/2002 | Straube et al. | |
| 2002/0004883 A1 | 1/2002 | Nguyen et al. | |
| 2002/0023051 A1* | 2/2002 | Kunzle et al. | 705/38 |
| 2002/0040376 A1 | 4/2002 | Yamanaka et al. | |
| 2002/0042869 A1 | 4/2002 | Tate et al. | |
| 2002/0049626 A1 | 4/2002 | Mathias et al. | |
| 2002/0049718 A1 | 4/2002 | Kleiman et al. | |
| 2002/0049738 A1 | 4/2002 | Epstein | |
| 2002/0049778 A1 | 4/2002 | Bell et al. | |
| 2002/0062230 A1* | 5/2002 | Morag et al. | 705/3 |
| 2002/0069324 A1 | 6/2002 | Gerasimov et al. | |
| 2002/0083055 A1 | 6/2002 | Pachet et al. | |
| 2002/0103848 A1 | 8/2002 | Giacomini et al. | |
| 2002/0107877 A1 | 8/2002 | Whiting et al. | |
| 2002/0133511 A1 | 9/2002 | Hostetter et al. | |
| 2002/0133512 A1 | 9/2002 | Milillo et al. | |
| 2002/0161753 A1 | 10/2002 | Inaba et al. | |
| 2002/0174107 A1 | 11/2002 | Poulin | |
| 2002/0174416 A1 | 11/2002 | Bates et al. | |
| 2003/0018657 A1 | 1/2003 | Monday | |
| 2003/0028736 A1 | 2/2003 | Berkowitz et al. | |
| 2003/0061491 A1 | 3/2003 | Jaskiewicz et al. | |
| 2003/0097296 A1* | 5/2003 | Putt | 705/11 |
| 2003/0131278 A1 | 7/2003 | Fujibayashi | |
| 2003/0135783 A1 | 7/2003 | Martin et al. | |
| 2003/0167380 A1 | 9/2003 | Green et al. | |
| 2003/0177149 A1 | 9/2003 | Coombs | |
| 2003/0177321 A1 | 9/2003 | Watanabe | |
| 2003/0187847 A1 | 10/2003 | Lubbers et al. | |
| 2004/0015468 A1 | 1/2004 | Beier et al. | |
| 2004/0039679 A1* | 2/2004 | Norton et al. | 705/37 |
| 2004/0098425 A1 | 5/2004 | Wiss et al. | |
| 2004/0107199 A1 | 6/2004 | Dalrymple et al. | |
| 2004/0117572 A1 | 6/2004 | Welsh et al. | |
| 2004/0139128 A1 | 7/2004 | Becker et al. | |
| 2004/0193953 A1 | 9/2004 | Callahan et al. | |
| 2004/0205206 A1 | 10/2004 | Naik et al. | |
| 2004/0220819 A1* | 11/2004 | Shetty et al. | 705/1 |
| 2004/0230829 A1 | 11/2004 | Dogan et al. | |
| 2004/0236958 A1 | 11/2004 | Teicher et al. | |
| 2004/0249883 A1* | 12/2004 | Srinivasan et al. | 709/203 |
| 2004/0250033 A1 | 12/2004 | Prahlad et al. | |
| 2004/0254919 A1 | 12/2004 | Giuseppini | |
| 2004/0260678 A1 | 12/2004 | Verbowski et al. | |
| 2004/0267835 A1 | 12/2004 | Zwilling et al. | |
| 2004/0267836 A1 | 12/2004 | Armangau et al. | |
| 2005/0027892 A1 | 2/2005 | McCabe et al. | |
| 2005/0033800 A1 | 2/2005 | Kavuri et al. | |
| 2005/0080928 A1 | 4/2005 | Beverly et al. | |
| 2005/0086443 A1 | 4/2005 | Mizuno et al. | |
| 2005/0108292 A1 | 5/2005 | Burton et al. | |
| 2005/0114406 A1 | 5/2005 | Borthakur et al. | |
| 2005/0144202 A1 | 6/2005 | Chen | |
| 2005/0187982 A1 | 8/2005 | Sato | |
| 2005/0187992 A1 | 8/2005 | Prahlad et al. | |
| 2005/0188254 A1 | 8/2005 | Urabe et al. | |
| 2005/0193026 A1 | 9/2005 | Prahlad et al. | |
| 2005/0198083 A1 | 9/2005 | Saika et al. | |
| 2005/0246376 A1 | 11/2005 | Lu et al. | |
| 2005/0268068 A1 | 12/2005 | Ignatius et al. | |
| 2006/0005048 A1 | 1/2006 | Osaki et al. | |
| 2006/0010227 A1 | 1/2006 | Atluri | |
| 2006/0020616 A1 | 1/2006 | Hardy et al. | |
| 2006/0047805 A1 | 3/2006 | Byrd et al. | |
| 2006/0064555 A1* | 3/2006 | Prahlad et al. | 711/154 |
| 2006/0120401 A1* | 6/2006 | Harada et al. | 370/465 |
| 2006/0129537 A1 | 6/2006 | Torii et al. | |
| 2006/0136685 A1 | 6/2006 | Griv et al. | |
| 2006/0230244 A1 | 10/2006 | Amarendran et al. | |
| 2006/0242371 A1 | 10/2006 | Shono et al. | |
| 2007/0043956 A1 | 2/2007 | El Far et al. | |
| 2007/0094467 A1 | 4/2007 | Yamasaki | |
| 2007/0100867 A1 | 5/2007 | Celik et al. | |
| 2007/0112897 A1 | 5/2007 | Asano et al. | |
| 2007/0113006 A1* | 5/2007 | Elliott et al. | 711/114 |
| 2007/0124347 A1 | 5/2007 | Vivian et al. | |
| 2007/0124348 A1 | 5/2007 | Claborn et al. | |
| 2007/0143371 A1 | 6/2007 | Kottomtharayil | |
| 2007/0143756 A1 | 6/2007 | Gokhale | |
| 2007/0179990 A1 | 8/2007 | Zimran et al. | |
| 2007/0183224 A1 | 8/2007 | Erofeev | |
| 2007/0185937 A1 | 8/2007 | Prahlad et al. | |
| 2007/0185938 A1 | 8/2007 | Prahlad et al. | |
| 2007/0185939 A1 | 8/2007 | Prahlad et al. | |
| 2007/0185940 A1 | 8/2007 | Prahlad et al. | |
| 2007/0186042 A1 | 8/2007 | Kottomtharayil et al. | |
| 2007/0186068 A1 | 8/2007 | Agrawal | |
| 2007/0192145 A1* | 8/2007 | Hellickson | 705/4 |
| 2007/0226438 A1 | 9/2007 | Erofeev | |
| 2007/0244571 A1 | 10/2007 | Wilson et al. | |
| 2007/0288536 A1 | 12/2007 | Sen et al. | |
| 2008/0016293 A1 | 1/2008 | Saika | |
| 2008/0059515 A1 | 3/2008 | Fulton | |
| 2008/0103916 A1* | 5/2008 | Camarador et al. | 705/26 |
| 2008/0104357 A1 | 5/2008 | Kim et al. | |
| 2008/0183775 A1 | 7/2008 | Prahlad et al. | |
| 2008/0229037 A1 | 9/2008 | Bunte et al. | |
| 2008/0243914 A1 | 10/2008 | Prahlad et al. | |
| 2008/0243957 A1 | 10/2008 | Prahlad et al. | |
| 2008/0243958 A1 | 10/2008 | Prahlad et al. | |
| 2008/0244177 A1 | 10/2008 | Crescenti et al. | |
| 2008/0306954 A1 | 12/2008 | Hornqvist | |
| 2009/0044046 A1 | 2/2009 | Yamasaki | |
| 2009/0150462 A1 | 6/2009 | McClanahan et al. | |
| 2009/0187944 A1* | 7/2009 | White et al. | 725/46 |
| 2009/0319534 A1 | 12/2009 | Gokhale | |
| 2010/0122053 A1 | 5/2010 | Prahlad et al. | |
| 2010/0131461 A1 | 5/2010 | Prahlad et al. | |
| 2010/0131467 A1 | 5/2010 | Prahlad et al. | |
| 2010/0179941 A1 | 7/2010 | Agrawal et al. | |
| 2010/0205150 A1 | 8/2010 | Prahlad et al. | |
| 2010/0211571 A1 | 8/2010 | Prahlad et al. | |
| 2011/0066599 A1 | 3/2011 | Prahlad et al. | |

(56) References Cited

U.S. PATENT DOCUMENTS

| | | | |
|---|---|---|---|
| 2011/0238621 | A1 | 9/2011 | Agrawal |
| 2011/0246416 | A1 | 10/2011 | Prahlad et al. |

FOREIGN PATENT DOCUMENTS

| | | |
|---|---|---|
| CA | 2632935 | 12/2006 |
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2003-47811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |
| WO | WO 2010/068570 | 6/2010 |

OTHER PUBLICATIONS

Harrington, L. H. (1998). The RFP Process: How to Hire a Third Party. Transportation & Distribution, 39(9), 96. Retrieved from EBSCOhost.*
Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).

Gray (#1 of 2, pp. 646-655), Jim; Reuter, Andreas, Transaction Processing: Concepts and Techniques, Morgan Kaufmann Publisher, USA 1994, 1994, pp. 646-655.
Gray (#2 of 2, pp. 604-609), Jim; Reuter Andreas, Transaction Processing Concepts and Techniques, Morgan Kaufmann Publisher, USA 1994, pp. 604-609.
Harrington, Lisa H., "The RFP Process: How To Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Mangement approach using LSI and Domain specific Ontologies", FLAIRS-01 Proceedings, 2001, pp. 300-302.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998.
Rosenblum et al., "The Design and Implementation of a Log-Structure File System," Operating Systems Review SIGOPS, vol. 25, No. 5, New York, US, pp. 1-15 (May 1991).
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.
Veritas Software Corporation, "Veritas Volume Manager 3.2, Administrator's Guide," Aug. 2001, 360 pages.
Wiesmann M, Database replication techniques: a three parameter classification, Oct. 16, 2000, pp. 206-215.
PCT International Search Report and Written Opinion for International Application No. PCT/US07/81681, Mail Date Nov. 13, 2009, 8 pages.
International Search Report and Written Opinion dated Nov. 13, 2009, PCT/US2007/081681.
International Preliminary Report on Patentability, PCT Application No. PCT/US2009/066880, mailed Jun. 23, 2011, in 9 pages.
International Search Report and Written Opinion issued in PCT Application No. PCT/US2011/030396, mailed Jul. 18, 2011, in 20 pages.
International Search Report and Written Opinion issued in PCT Application No. PCT/US2011/38436, mailed Sep. 21, 2011, in 18 pages.
Examiner's Report for Australian Application No. 2003279847, Dated Dec. 9, 2008, 4 pages.
First Office Action for Japanese Application No. 2003531581, Mail Date Jul. 8, 2008, 8 pages.
Final Office Action for Japanese Application No. 2003531581, Mail Date Mar. 24, 2009, 6 pages.
International Search Report dated May 15, 2007, PCT/US2006/048273.
European Examination Report; Application No. 06848901.2, Apr. 1, 2009, pp. 7.
Second Examination Report in EU Appl. No. 06 848 901.2-2201 dated Dec. 3, 2010.
Examiner's First Report; Application No. 2006331932 May 11, 2011 in 2 pages.
International Search Report and Written Opinion, PCT/US2009/066880, dated Mar. 25, 2010, 10 pages.
International Search Report dated Dec. 28, 2009, PCT/US2004/038324.
International Search Report and Written Opinion dated Jan. 11, 2006, PCT/US2004/038455.
Canadian Office Action dated Dec. 29, 2010, Application No. CA2546304.

* cited by examiner

FIG. 2

*Professional Services*

Pre-Sales / Post-Sales Customer Project Lifecycle Portal: Define Target Device Environment In order to complete the form below, please have tech following available:
- Information about the tape library and tape drives that will be used for this project
- Information about the disk storage, if any, that will be used for this project
- Information about how disk storage is used in the customer's Enterprise
- Information about the connections between the CommServe, MediaAgent(s) and the target devices

*200*

Note: Those items in BOLD ITALIC FONT must be completed in order to provide the PS team with specific detail necessary to complete an accurate quotation for services.

| | |
|---|---|
| *General* | |
| Are the targets for backup operations for this project installed and working? | ○ Yes ⊙ No |
| Will copies of backups be made for offsite storage? | ○ Yes ⊙ No |
| *Connection* | |
| How will MediaAgent(s) attach to target? | Select how the MA(s) will attach ▾ |
| If both disk and tape are attached to the MediaAgent(s), are separate HBAs used for each connection type? | ○ Yes ⊙ No |
| If connection through a Fibre Channel switch is used to connect targets, is switch zoning used? | ○ Yes ⊙ No |
| *Tape Library* | |
| Will backups be written to tape? | ○ Yes ⊙ No |
| *Virtual Tape Library (VTL)* | |
| Will backups be written to a Virtual Tape Library? | ○ Yes ⊙ No |
| *Disk* | |
| Will backups be written to disk? | ○ Yes ⊙ No |

Define Target Device Environment

| Project Scope: | |
|---|---|
| Non-Production Pilot? | No |
| Type of Employment: | Standard |
| Custom Deployment Information (if any) | |
| Business Requirements to be Addressed in this Project | |
| Projected Timeline: | Early March |
| Application Architecture: | Customer is rapidly growing from a small to medium sized shop. Data center is primarily Windows, but has a pair of Solaris servers supporting LOB application. Customer has 1 large file server, and 2 exchange servers which will employ DM. Implementation of new SAN storage and TLU is imminent. |
| Business Case for this Deployment: | |
| Additional Instructions (if any): | |
| Site Info | Site #1 |
| Label Description | Colo / DR |
| Site Type | Galaxy Backup |

FIG. 4

*Professional Services*

Client Pre-Installation Portal: Request Manager
Company: XYZ Inc.
Requestor E-mail Address: charliebrown@schultz.com
Request Started On: 5/27/2009 8:35:19 AM

*400*

| | |
|---|---|
| Site #1 | 25100 Morning Glory Rd |
| | Springfield, TN 31024 |
| | [Edit\Delete] |

| | |
|---|---|
| CommServe: | EM-PRIN05 (01.111.11.000) [Edit\Delete] |
| MediaAgent: | EM-PRIN08 (01.000.22.100) [Edit\Delete] |
| MediaAgent: | EM-PRDB01 (01.010.01.220) [Edit\Delete] |
| MediaAgent: | EM-PRDB02 (01.100.11.021) [Edit\Delete] |

Target Device Environment [Edit\Delete]
System and Application Information [Edit\Delete]

Add a CommServe     Add a MediaAgent

| | |
|---|---|
| Site #2 | 558 South Abraham Ct |
| | Youngtown, NM 11297 |
| | [Edit\Delete] |

| | |
|---|---|
| CommServe: | SM-PRIN05 (01.112.11.000) [Edit\Delete] |
| MediaAgent: | SM-PRIN08 (01.001.22.100) [Edit\Delete] |
| MediaAgent: | SM-PRDB01 (01.011.01.220) [Edit\Delete] |
| MediaAgent: | SM-PRDB02 (01.101.11.021) [Edit\Delete] |

Target Device Environment [Edit\Delete]
System and Application Information [Edit\Delete]

Add a CommServe     Add a MediaAgent

Add a Supporting File
to this Request
(Example files may include: Visio
Diagram of your Server Environment,
Server Roster, CommCell
Readiness Report, etc...)

I'm Done!
Submit My Request

*FIG. 5*

*Professional Services*

Trip Report Portal: Report Manager
Trip Report ID: 10020 [Edit]
Sales Order: 15555
Customer: Broadway University
Pre-Install Request ID: 64275
Reporting Engineer: Mitchell Mouse
Reporting Engineer E-mail: mmouse@kartoon.com
Trip Start Date: 3/5/2009
Trip End Date: 3/6/2009
TRs Opened During Trip: No
Report Started On: 3/8/2009 5:56:35 PM
Report Last Edited: 3/8/2009 6:31:53 PM Trip Calendar Revise Trip Calendar Days Summary:
- Billable: 2
- Non-Billable: 0
- Admin: 0
- TR Billable: 0
- TR Non-Billable: 0
- Pre-Sales: 0
- Non Work: 0

BU (Site #1)

19092 Bikini Ln 
Plantation Beach, GA 27690
United States
Site Type: Primary
# of Remote Sites: 0

CommServe: 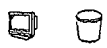
GCU-IT-BKUP (Will get on-site)      *500*
MediaAgent: 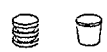
GCU-IT-BKUP (Will get on-site)
Target Device Environment 

System and Application Information 

*Uploaded Files*
- BroadwayLANSANdrawings.vsd [Edit or Replace \ Delete]
- GalaxyReport_CommCellSummaryReport_006293725_2357.htlm [Edit or Replace \ Delete]

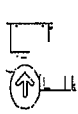 

Add a Supporting File          I'm Done!
to this Request           Submit My Request
(Example files may include: Visio
Diagram of your Server Environment,
Server Roster, CommCell
Readiness Report, etc...)

*FIG. 6*

| | | |
|---|---|---|
| Customer Site Visit Report | | |
| CUSTOMER AND CONTACT INFORMATION | | |
| | Company Name: | ABC Group (Phase II) |
| | Company Address: | 12345 First Ave, NY, NY |
| Customer Contact(s) | Name: | Fred Jackson / Will Stevens |
| | Phone: | 321 222 3333 |
| | E-mail: | fjackson@abc.org |
| Account Team | Acct Rep: | Jack Silva |
| | SE: | |
| Consulting Engineer: | | William King |
| Service Date(s): | | 8/10/09 - 8/11/09 |
| SITE STATUS AT ARRIVAL: | | |
| Galaxy 6.1 environment present | | |
| ACTIVITIES AND TASKS PERFORMED DURING VISIT: | | |
| Installed 1 Touch on a dedicated server<br>Ran patch updates<br>Created the Windows distribution share from a Windows 2003 CD<br>Initiated a new system state backup for a test client<br>Created boot ISO & burned it to CD<br>- The native drivers were insufficient to start networking. Downloaded and tried 2 other sets of drivers, to no avail – even though the drivers appear to match the required drivers for the network card. Case #177570 opened to explore this<br>Even though a full 1 Touch demonstration was not completed, I had a KT session with the client (Will) on the entire process<br><br>Configured VT, scheduled VT, scheduled VT reports.<br>Tested VT immediately, as well as on a regular schedule<br>Customer signed the CPAF. Customer (Will) will follow up on the 1 Touch driver case when time permits (in about a week) as it is not a high priority item. | | |
| SITE STATUS PRIOR TO DEPARTURE: | | |
| 1 Touch case open regarding network driver mismatch(?) | | |
| FOLLOW UP ACTIONS REQUIRED: | | |
| | | |

600

SYSTEM AND METHOD FOR AUTOMATING CUSTOMER-VALIDATED STATEMENT OF WORK FOR A DATA STORAGE ENVIRONMENT

RELATED APPLICATIONS

This application is a continuation of U.S. patent application Ser. No. 13/608,931, filed Sep. 10, 2012, which is a continuation of U.S. patent application Ser. No. 12/044,261, filed Mar. 7, 2008, now U.S. Pat. No. 8,290,808, issued Oct. 16, 2012, which claims the benefit of priority under 35 U.S.C. §119(e) of U.S. Provisional Patent Application No. 60/906,177, entitled "Systems and Methods for Professional Services Automation," filed Mar. 9, 2007, each of which is hereby incorporated herein by reference in its entirety.

BACKGROUND

1. Field of the Invention

Embodiments of the invention relate to workflow automation and, in particular, computer systems and methods for professional services management.

2. Description of the Related Art

Professional services automation ("PSA") applications are often used by organizations whose work is project-based and/or human resource intensive to make their operations more efficient and/or their resources more productive. In general, PSA applications comprise enterprise resource planning software usable by individuals and organizations working in a project-oriented environment. For instance, PSA applications can be used by a company's internal service departments (e.g., IT department) and/or can be beneficial to consultants and organizations providing billable services, such as, for example, accounting services, computer system implementation teams and others. Use of a PSA provides specific organizational value in the reduction of job costs associated with the delivery of consulting services to customers.

Many conventional PSA applications are provider-based and directed to provider-specific workflow issues. For example, certain PSA applications manage professional service provider time, expense and billing reports, while other PSA applications identify to a provider which resources and/or personnel are available for a particular project. Such PSA applications are generally focused on the provider's needs and improving workflow and/or efficiency for one or more established projects.

Moreover, professional service providers must often coordinate projects remote to the provider that are distributed in different geographic regions. Certain companies have attempted to address geographic issues in professional services management by turning to a combination of MICROSOFT Office applications (e.g., OUTLOOK, EXCEL, Word, Project). Such solutions, however, limit information sharing between geographic regions or countries within international organizations. Moreover, the lack of integration of these programs between different regions tends to degrade efficiencies associated with the communication of key data points regarding information gained in the field.

SUMMARY

In view of the foregoing, a need exists for computer systems and methods for providing a systematic approach to the automation of workflow associated with managing professional services delivery. Moreover, a need exists for improved systems and methods for automating service delivery business processes more efficiently. For instance, there is a need for improved professional services automation and project-lifecycle management in the data management area.

For example, there is a need for an improved services management system that obtains customer validation of a pre-sales effort prior to the post-sale deployment of professional services. For instance, computer systems and methods disclosed herein can obtain customer validation of the customer's product environment prior to the generation and performance of a Statement of Work (SOW), a work breakdown structure or the like in order to provide more efficient and accurate professional services tailored to the needs of the customer.

In certain embodiments of the invention, a network (e.g., internet, intranet) accessible computer system is provided that automates the process by which a professional services group and/or individual scopes or defines a professional services project, engages a customer or client, and/or closes each professional services engagement. In certain embodiments, the computer system includes a network accessible interface in the form of one or more web portals accessible by the services provider and/or the customer.

For example, the network accessible interface can comprise a portal having three subsites: a "Pre-Sales Portal," a "Client Portal," and a "Post-Deployment Portal." The portals are then used to collect relevant site data for each project to be delivered by the professional services provider. For instance, the data can be used to ensure that an onsite engineer has information regarding the customer site product configuration, status, and customer expectations necessary to complete the engagement on time and/or at an appropriate level of customer satisfaction. Information regarding the delivery of professional services can also be collected and maintained in a searchable repository post-deployment, which can assist professional services and customer support organizations to better manage relevant details associated with each deployment's successes and/or issues. In certain embodiments, the three subsites are interconnected, enabling workflow automation and transition validation from potential projects, to those that must be scheduled, to those that are completed and then preserved for audit and organizational shared knowledge.

In certain embodiments, a computer system is disclosed for automatically identifying service recommendations for data management environments. The computer system comprises a plurality of records corresponding to a plurality of data storage system environments and a first portal module configured to receive first data regarding a first data storage system of the plurality of data storage system environments, the first data storage system corresponding to a customer. The computer system further comprises a manager module in communication with the first portal module to receive the first data, the manager module being configured populate a first record of the plurality of records with the first data. The computer system also includes a second portal module in communication with the manager module and configured to transmit the first record for review by the customer, the second portal module being further configured to receive validation input from the customer with respect to the first record, wherein, after receiving said validation input, the manager module is further configured to automatically generate a proposed project description of services to be performed with respect to the first data storage system based at least on the first data from the first record.

In certain embodiments, a computer system is disclosed for automating workflow for services in a data management environment. The computer system comprises means for storing records corresponding to a plurality of data storage system environments and means for receiving first data regarding a first data storage system of the plurality of data storage system environments, the first data storage system corresponding to a customer. The computer system also includes means for populating a first record of the plurality of records with the first data and means for providing the customer with access to the first record, said means for providing being further configured to receive validation input from the customer with respect to the first record, wherein, after receiving said validation input, said means for populating is further configured to generate a proposed project description of services to be performed with respect to the first data storage system based at least on the first data of the first record.

In certain embodiments, a method is disclosed for automating workflow in the performance of professional services. The method comprises receiving first data indicative of a product environment of a customer and storing the first data in one or more records. The method further includes providing the customer with access to the one or more records through a network accessible interface and receiving validation from the customer regarding the first data of the one or more records. The method also includes, following said receiving the validation, automatically generating a description of one or more recommended services to be performed with respect to the product environment based at least in part on the validated first data.

For purposes of summarizing the disclosure, certain aspects, advantages and novel features of the inventions have been described herein. It is to be understood that not necessarily all such advantages may be achieved in accordance with any particular embodiment of the invention. Thus, embodiments of the invention may be carried out in a manner that achieves one advantage or group of advantages as taught herein without necessarily achieving other advantages as may be taught or suggested herein.

BRIEF DESCRIPTION OF THE DRAWINGS

FIGS. 2 and 3 illustrate screenshots of exemplary embodiments of portal pages for facilitating data collection by the pre-sales portal of the workflow automation environment of FIG. 1.

FIG. 4 illustrates a screenshot of an exemplary embodiment of a portal page for obtaining project-specific information from a customer by the client portal of the workflow automation environment of FIG. 1.

FIG. 5 illustrates a screenshot of an exemplary embodiment of a portal page for obtaining project completion information by the post-deployment portal of the workflow automation environment of FIG. 1.

FIG. 6 illustrates a screenshot of an exemplary embodiment of a "Customer Site Visit Report" completed by the field personnel of the workflow automation environment of FIG. 1.

DETAILED DESCRIPTION OF THE PREFERRED EMBODIMENTS

Figure 1:
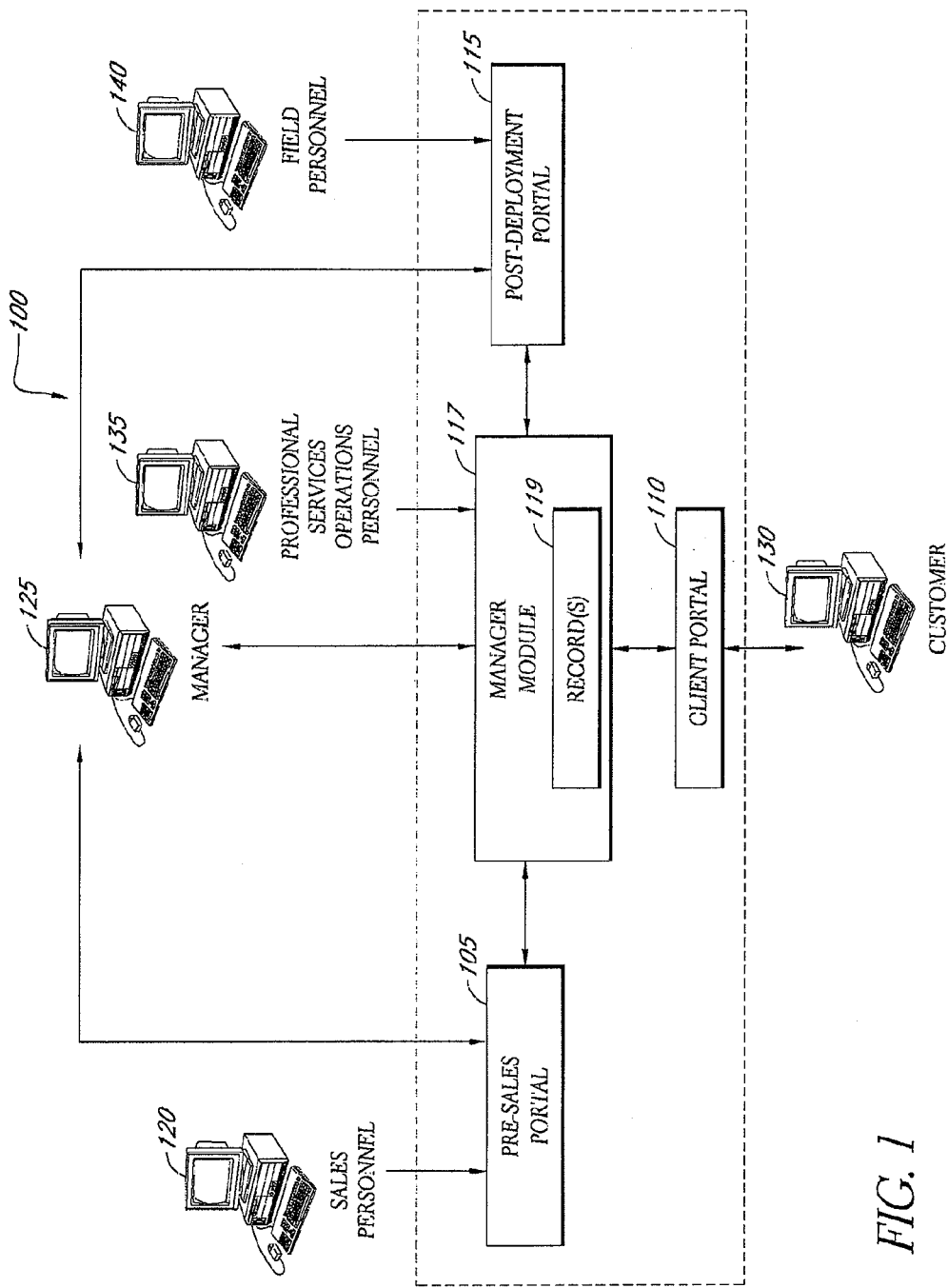
FIG. 1 illustrates a data flow diagram of a workflow automation environment according to certain embodiments of the invention.

In professional services environments, project scope, risk, and site-specific project knowledge are workflow elements that generally require consistency from project concept to project completion. Creation of a common project workflow, per engagement, expedites the transmission of knowledge necessary to scope a project, complete a project and validate the effectiveness of service delivery. In certain embodiments, this expeditious processing of relevant project details substantially decreases the time scales associated with the successful completion of a project thereby reducing per project costs. Whereas certain conventional PSA applications provide some level of pre-sales to post-sales collaboration on project creation and completion, such PSA applications lack means for obtaining customer validation of the pre-sales effort prior to the post-sales deployment. Certain embodiments of the invention address this and other significant drawbacks of conventional PSA applications by including interim validation by the customer of the customer's product environment, which advantageously exposes any gaps between the customer's expectations and the provider's quote of specific professional services before delivery of the services.

Certain embodiments of the invention can also integrate the workflow of a plurality of parties associated with the delivery of professional services, such as those that sell services, those that provide services, and those that receive services. For example, embodiments of the invention can be used to "close the loop" associated with the successful implementation of those services at a customer site. Based on the success of that implementation, secondary systems within the service provider's organization can also become more efficient (e.g., finance department, support department). For example, a stored history of each completed project can be later used by account management teams for reference generation associated with completed projects that match current opportunity requirements, thereby reducing the time to close for sales opportunities.

As disclosed herein, certain embodiments of the invention include a computer system comprising multiple modules, or portals, that obtain information pertaining to the workflow associated with one or more projects. Such portals can comprise network accessible interfaces through which a professional services provider and/or client or customer can input data relating to a particular project. Furthermore, in certain embodiments, a professional services workflow automation process advantageously includes: (1) customer validation of the project scope and deliverables prior to deployment of the associated services, and/or (2) an automated analysis of potential issues within the customer product environment that may impede a successful services engagement, and/or provision of information regarding exception handling relevant to specific projects whereby site specific licensing or services are needed.

Certain embodiments of the invention are advantageously used in connection with professional services relating to data management systems, such as those services and systems provided by CommVault Systems, Inc. (Oceanport, N.J.). For instance, certain embodiments of the invention described herein can be used in connection with CommVault's SIMPANA storage management system or CommVault's QINETIX storage management system, details of which are further included U.S. patent application Ser. No. 09/354,058, filed Jul. 15, 1999, the entirety of which is hereby incorporated herein by reference in its entirety to be considered a part of this specification. In yet other embodiments, the professional services automation system can be used in connection with a modular storage architecture, such as CommVault's GALAXY, which is more fully described in U.S. Pat. No. 7,035,880, issued Apr. 5, 2006, which is hereby incorporated herein by reference in its entirety to be considered a part of this specification. However, it is contemplated that the inventions disclosed herein may also be applicable to other professional services environments, such as, for example, with hardware deployment, accounting services or the like.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

FIG. 1 illustrates a data flow diagram of a workflow automation environment 100, according to certain embodiments of the invention. In particular, embodiments of the workflow automation environment 100 can be used, by a professional services provider to scope a potential project, engage a customer or client, obtain validation of the customer's product environment prior to the sale and/or delivery of professional services, and/or close each professional engagement. Moreover, the workflow automation environment 100 allows for both provider and customer input during multiple stages throughout the workflow automation process.

Embodiments of the workflow automation environment 100 are designed to obtain customer validation of pre-sales input concerning the customer's product environment. Such validation can be advantageously obtained prior to the post-sale deployment of professional services and/or the generation of a Statement of Work or like project scope definition.

As shown, the workflow automation environment 100 comprises a workflow automation system 102 that provides for retrieval, display, and or analysis in connection with the delivery of one or more professional services to a customer. In certain embodiments, the workflow automation system 102 comprises one or modules, such as one or more software programs executable on one or more processors. In certain embodiments, the workflow automation system 102 executes on a single server or a highly available, clustered web environment, such as the corporate web server provided by CommVault Systems, Inc. (Oceanport, N.J.).

As illustrated in FIG. 1, the workflow automation system 102 comprises a plurality of interfaces, or portals, usable to display and obtain information from a plurality of users. In certain embodiments, the plurality of interfaces is used to collect relevant site data for each project to be delivered by the professional services provider. As shown, the illustrated workflow automation system 102 comprises a network accessible portal (e.g., a web portal) that includes three subsites: a pre-sales portal 105, a client portal 110, and a post-deployment portal 115. In certain embodiments, each of the three subsites 105, 110 and 115 is housed on a server. In other embodiments, the subsites can be distributed across multiple servers or like computing devices in network communication with each other and/or one or more common databases for storage of information. Although the workflow automation system 102 is described with reference to multiple portals, it will be understood from the disclosure herein that the system 102 can comprise a single portal accessible through multiple subsites or interfaces.

In certain embodiments, the pre-sales portal 105 receives data regarding a potential sales opportunity for a customer environment. For instance, in certain embodiments, the pre-sales portal 105 receives data from one or more sales personnel 120, or sales engineers, regarding information about a customer's product environment. Such information regarding the product environment in a data management setting can include, for example, the amount of disk memory, the types of storage media, the types of disaster recovery systems, the application(s) running on the customer's computer system, particular services requirement(s), combinations of the same and like information.

In certain embodiments, the pre-sales portal 105 provides the sales personnel 120 with specific questions and/or prompts to obtain the data regarding the customer's product environment. For instance, in certain embodiments, the sales personnel 120 may enter information through the pre-sales portal 105 during an initial meeting with a customer. In addition to the product environment data discussed above, the sales personnel 120 can also obtain and enter data regarding customer contact information, the customer's professional services expectations, customer working hours, combination of the same or the like.

In one example, the pre-sales portal 105 can prompt sales personnel 120 to answer one or more of the following questions or prompts to gather data regarding a customer's data management environment:

a. What are the customer's expectations with regards to professional services delivery? (e.g., small deployment, standard deployment, custom deployment)

b. Are there any special events or phases that would require the services to be broken up into multiple delivery dates? If so, please describe.

c. Please input any specific deadlines (e.g., less than two weeks, less than 30 days) the customer is trying to meet for this deployment.

d. Please give a description of the environment and architecture developed during the sales campaign.

e. Were there any cost or labor savings targeted for this deployment? What aspects of the product configuration and design should the professional services provider focus on?

f. Are there any additional comments/instructions that the professional services provider should know in order to accurately quote services/achieve customer goals?

g. Is the customer deploying new infrastructure components (network, servers, storage, etc.) that could affect the scheduling of the deployment? If so, what are the changes and what are the timelines for the deployment of these components?

h. What are the customer's working hours?

i. Does the customer have a formal Change Control process? If so, please describe the process.

j. Are reboot windows defined for certain systems?

k. Will professional service field personnel have Administrator access to all the servers to be configured?

l. Will the customer assign an administrator to assist the professional service field personnel?

As will be understood from the disclosure herein, the sales personnel 120 can advantageously access the pre-sales portal 105 from a location remote to the workflow automation system 102, such as at the customer's site. For instance, the sales personnel 120 can be in network communication with the workflow automation system 102 through a personal computer, workstation, laptop, personal digital assistant (PDA), smart phone, cell phone, portable computing device, combinations of the same or the like in order to enter data into the pre-sales portal 105. For example, one or more of the users of the workflow automation system 102 (e.g., sales personnel 120, personnel services manager 125, customer 130, professional services operations personnel 135 and/or field personnel 140) can access one or more of the portals 105, 110, 115 through the use of a browser of an electronic device. In certain embodiments, the user can also enter information through a disconnected browser or other software that later forwards/uploads the pertinent information to the workflow automation system 102. In yet other embodiments, data regarding the customer product environment can be automatically generated based on one or more monitoring applications and/or records of prior projects or services performed in the customer product environment.

For instance, FIGS. 2 and 3 illustrate screenshots of exemplary embodiments of portal pages for facilitating data collection by the pre-sales portal 105. In particular, FIG. 2 illustrates an example of a portal page 200 that includes prompts and callouts for facilitating data collection by the pre-sales portal 105. FIG. 3 illustrates an example of a portal page 300 that includes free text fields available to gather data defining specific requirements on a per-project basis. It will be understood from the disclosure herein that the pages 200, 300 provide examples of single pages or portions of a page and can be combined with other data entry pages to obtain relevant information regarding the customer's product environment.

With continued reference to FIG. 1, a manager module 117 is in communication with the pre-sales portal 105. In certain embodiments, the manager module 117 receives customer-specific data obtained by the pre-sales portal 105. For instance, in certain embodiments, the data collected by the pre-sales portal 105 is used to populate one or more records 119 pertaining to the specific customer's product environment and/or recommended services relating thereto. In certain embodiments, the manager module 117 maintains the record(s) 119 and updates the information therein, based, at least in part, on information received through the portals 105, 110, 115.

As shown, the manager module 117 further communicates with a professional services manager 125. In certain embodiments, the manager module 117 and/or the professional services manager 125 uses the data obtained by the pre-sales portal 105 to scope and/or generate a quote for applicable professional services based on the customer's product environment data. For instance, the manager module 117 can automatically generate a Statement of Work or other professional services project definition, identify potential risks associated with a particular project, create a timeline, estimate costs, combinations of the same or the like.

The client portal 110 also communicates with the manager module 117. In certain embodiments, the client portal 110 advantageously provides a customer 130 access to the workflow automation system 102. For example, the client portal 110 can provide the customer 130 with an opportunity to review data input by the sales personnel 120 (e.g., through access to the record(s) 119), to input additional data relating to the customer's product environment, validate entered data, combinations of the same or the like. In certain embodiments, access by the customer is provided through a uniform resource locator (URL) address sent to the customer 130 by the workflow automation system 102.

In certain embodiments, the customer 130 accesses the client portal 110 at the time the customer 130 is interested in obtaining professional services from the provider. In such embodiments, the customer 130 can be forwarded a summary of the customer product environment information initially input by the sales personnel 120 into the pre-sales portal 105. This advantageously allows the customer 130 to review the product environment data for accuracy and/or completeness before any deployment of services and without the time-consuming process of back-and-forth revising of a particular Statement of Work or like project description.

The client portal 110 can also communicate with the customer 130 to obtain additional details relating to the status of the customer's product environment. For instance, the client portal 110 can provide the customer 130 with one or more questions in order to obtain data on site readiness, customer contact and location information, additional information regarding the scope of deployment, hours of operation of the customer, which libraries are being used by the customer, customer storage preferences (e.g., magnetic disk or tape), other customer preferences, combinations of the same or the like. Such operation of the client portal 110 advantageously allows the customer 130 to use its own words or phrases with respect to its requirements, which language is later used by field personnel 140 to verify that the customer's expectations have been met.

Thus, unlike conventional PSA applications, which are primarily based on details of the service provider personnel and resources, the workflow automation system 102 provides system access to the customer 130 and requests customer feedback and validation. This customer-specific approach and system advantageously enables a service provider to obtain additional customer input and further customize its services early in the workflow automation process, thereby increasing the degree to which one or more projects later scoped or recommended by the provider to the customer will coincide with the customer's expectations.

For instance, FIG. 4 illustrates a screenshot of an exemplary embodiment of a portal page for obtaining project-specific information from a customer by the client portal 110. In particular, FIG. 4 illustrates a "Request Manager" portal page 400 that obtains information from the customer with respect to its data management product environment.

The client portal 110 also advantageously provides a validation that quoted or recommended services align with the customer expectations. For instance, in certain embodiments, when discrepancies exist between data received by the pre-sales portal 105 and data received from the customer 130 by the client portal 110, the manager module 117 can automatically note the discrepancies and/or alert the services manager 125 and/or professional services operations personnel 135 for review and/or redress. In certain embodiments, other noteworthy issues related to the customer site based on information received through the client portal 110 can also be recorded and/or communicated to the proper personnel. An example of a portal output that includes site issue automated analysis is illustrated below in Table 1.

TABLE 1

THE FOLLOWING ITEMS HAVE BEEN FLAGGED FOR REVIEW:
Site #1: MediaAgent #1: Tape/Device Drivers for Backup
Targets NOT Installed
Site #1: MediaAgent #1: System Mgmt Servers or daemons are
running on this server
Site #1: Target Device Environment: Separate HBAs NOT used
for each connection type (Tape and Disk)
Site #1: Target Device Environment: Disk Array is NOT Attached
to CommServe/MediaAgent(s)
Site #1: Target Device Environment: Disk Targets(s)/Mount
Point(s) for the Disk Array have NOT been assigned to the(ir)
appropriate servers
Site #1: Target Device Environment: Backups WILL BE written to
CAS or WORM-locked storage

| | |
|---|---|
| Client/Company: | XYZ Company |
| Submitter's E-Mail Address: | is_admin@xyz.com |
| Request ID: | 10174 |
| Street Address | 1234 Any Rd. |
| City | Cityname |
| State/Province | Statename |
| Zip/Postal Code | 99999 |
| Country | United States |
| Name | John Smith |
| Office Phone | 111 123 4567 |
| Cell Phone | 111 123 4568 |
| E-Mail Address | jsmith@xyz.com |
| Name | Mary Jones Studer |
| Office Phone | 111 123 4569 |
| Cell Phone | N/A |
| E-Mail Address | mjones@xyz.com |
| Received CommVault Software Media? | Yes |

To complete this project, the customer's Enterprise requires:

| | |
|---|---|
| Certification of Insurance from CommVault: | No |
| Non-Disclosure Agreement from CommVault: | No |
| Contractor Badges for CommVault Engineers: | No |
| Network Security Statement from CommVault: | No |
| CommVault's Engineer(s) Issued Temp Sys Admin Rights? | Yes |
| Current Backup Software in the Enterprise? | NetWorker |
| Software/Services associated with this project were purchased from: | Reseller: Backup Investments |
| CommServe Server Name | Commserve |
| CommServe IP Address | 123.1.1.1 |
| CommServe Operating System | Windows 2003 SP1 |
| CommServe CPU Type | 32-bit Intel |
| CommServe CPU Count | 1 |
| CommServe RAM | 4 GB |
| CommServe Network Connection | Multihomed |
| CommServe dedicated to backup operations? | Yes |
| This server can be rebooted during business hours? | Yes |
| Internet Information Server Installed on this server? | Yes |
| Internet Explorer 5.5 (or better) Installed on all Windows Servers? | Yes |
| Is CommVault software Currently Installed in Customer's Data Center(s)? | No |
| FTP Access Possible from the CommServe? | Yes |
| MediaAgent Server Name | Mediaagent |
| MediaAgent IP Address | 111.1.1.1 |
| MediaAgent Operating System | Windows 2003 SP1 |
| MediaAgent CPU Type | 32-bit Intel |
| MediaAgent CPU Count | 2 |
| MediaAgent RAM | 8 GB |
| MediaAgent Network Connection | Multihomed |
| MediaAgent dedicated to backup operations? | Yes |
| This server can be rebooted during business hours? | Yes |
| Tape/Device Drivers for Backup Targets Installed? | No |
| Systems Mgmt Services or daemons running on this server? | Yes |
| Is there a firewall between this server and the CommServe? | No |
| MediaAgent Clustered? | No |
| Targets for Backup Ops for this Project Installed and Working? | Yes |
| Support Contracts in place for Target Hardware? | Yes |
| Will Copies of Backups be Made for Offsite Storage? | Yes |
| How will MediaAgents attach to targets? | SCSI |
| HBA Manufacturer Used for Connection to Targets: | Other |

TABLE 1-continued

THE FOLLOWING ITEMS HAVE BEEN FLAGGED FOR REVIEW:
Site #1: MediaAgent #1: Tape/Device Drivers for Backup
Targets NOT Installed
Site #1: MediaAgent #1: System Mgmt Servers or daemons are
running on this server
Site #1: Target Device Environment: Separate HBAs NOT used
for each connection type (Tape and Disk)
Site #1: Target Device Environment: Disk Array is NOT Attached
to CommServe/MediaAgent(s)
Site #1: Target Device Environment: Disk Targets(s)/Mount
Point(s) for the Disk Array have NOT been assigned to the(ir)
appropriate servers
Site #1: Target Device Environment: Backups WILL BE written to
CAS or WORM-locked storage

| | |
|---|---|
| Separate HBAs used for each connection type? (Disk or Tape) | No |
| Backups Written to Tape? | Yes |
| Number of Tape Drives Used for Backup & Recovery: | 2 |
| Type(s) of Tape Drives to be Used: | LTO3 |
| Labeled Tapes in the Library? | Yes |
| Library Manufacturer/Vendor: | HP |
| Library Model Number/Designation: | 6030 |
| MediaAgent(s) at this site will be writing to the Tape Library: | |
| Backups Written to Disk? | Yes |
| Disk Array Attached to CommServe/MediaAgent(s)? | No |
| Target Disk for Backups Regularly Defragmented? | Yes |
| Disk target(s)/mount point(s) for the disk array been assigned to the(ir) appropriate servers? | No |
| How large are the disk target(s)/mount point(s) for backup? | Awaiting delivery of disk arrays |
| Snapshots Used for Disk-Based Backup in the Enterprise? | No |
| How many days of backup will be maintained on disk? | one week |
| Should images on disk also be copied to tape for offsite storage? | Yes |
| Enterprise Disk Environment Includes NAS Storage? | Yes |
| NAS Storage Backup Method: | shares |
| NAS Manufacturer: | NetApp |
| Backups written to CAS/WORM-locked storage? | No |
| MediaAgent(s) at this site will be writing to the Tape Library: | |
| The following quantities of platforms will be part of this project: | |
| Windows 2000/2003: | 60 |
| Sun Solaris: | 4 |
| Linux RedHat: | 10 |
| Apple Macintosh: | 3 |
| Anti-Virus Software Running on the Client Systems? | Yes |
| Anti-Virus Software Vendor: | Symantec |
| Firewalls Separate the Client Systems from the CommServe/MediaAgent(s)? | No |
| Completing Remote (WAN-based) Backups of Client Systems to the CommServe/MediaAgent(s)? | No |
| Client Network Connections: | Gigabit Ethernet |
| Completing online database backups of Microsoft Exchange? | No |
| Completing online database backups of Oracle? | Yes |
| RMAN Currently Used for 3rd Party Backups of Oracle? | Yes |
| Oracle Version(s): | |
| Oracle DBA onsite that will be accessible to the CommVault engineer during the project? | No |
| RCAT DB and RMAN Catalog Already Created? | No |
| Oracle on a Cluster? | No |
| Are the ORA Target Databases in 'archivelog' mode? | No |
| Are all ORA Databases known/registered in tnsnames.ora? | No |
| Network Authentication Enabled for the Databases that will be completing backup? | No |
| Oracle is running on Linux? | No |
| Completing online database backups of SAP? | No |
| Completing online database backups of Microsoft SQL Server? | Yes |
| SQL Server Version: | SQL 7, SQL 2000 |
| What tool is used currently to complete backups of SQL Server? | 3rd Party Backup Tool |
| SQL Server Clustered? | No |
| Completing online database backups of Microsoft SharePoint Portal Server? | No |
| Completing online database backups of Lotus Notes? | No |
| Completing online database backups of Novell GroupWise? | No |
| Completing online database backups of dB2? | No |

As can be seen, Table 1 provides an example of a completed report that can be sent (e.g., automatically) to the services manager 125, field personnel 140, and/or field engineers for review after receiving input from the customer 130. In certain embodiments, the report includes a list of items that have been identified as potential risks or problems and/or specifies the project scope prior to the generation of a Statement of Work or like project definition.

In certain embodiments of the invention, the customer input prior to the delivery of the particular service(s) advantageously addresses an "expectation gap," which often exists in conventional PSA applications, between the services scoped and sold by the professional services provider and the services expected by the customer. As discussed above, such timing of obtaining the customer input advantageously allows for early comparison with the recommended services scoped from the product environment data gathered by the pre-sales portal 105.

As further illustrated in FIG. 1, the manager module 117 communicates with the post-deployment portal 115. In certain embodiments, the post-deployment portal 115 provides an interface from the workflow automation system 102 to the field personnel 140. For example, the post-deployment portal 115 can allow the field personnel to access (e.g., read and/or modify) the record(s) 119 maintained by the manager module 117. In certain embodiments, the data in the record(s) 119 can be used to ensure that field personnel 140, such as one or more onsite engineers, have necessary and/or relevant information regarding the customer site configuration, status, and/or customer expectations to complete a particular project on time and at an appropriate level of customer satisfaction.

The post-deployment portal 115 can also receive additional information from field personnel 140 at the completion of a phase of work associated with the recommended professional services. For instance, the post-deployment portal 115 can advantageously obtain data regarding the status of the project at the final day of onsite work, any issues associated with the site deployment/software, the next steps in the project for an account management group, combinations of the same or the like.

For instance, FIG. 5 illustrates a screenshot of an exemplary embodiment of a portal page for obtaining project completion information by the post-deployment portal 115. In particular, FIG. 5 illustrates an exemplary "Trip Report Manager" portal page 500 usable to create a report after the completion of a particular project. As shown, the portal page 500 includes data relating to time management (calendaring), support escalations (trouble reports management), work completed detail and relevant site licensing information.

FIG. 6 further illustrates a screenshot of an exemplary embodiment of a "Customer Site Visit Report" 600 completed by the field personnel 140. In particular, the post-project report 600 requests data that relates to completion of the project and a project survey analysis. The report 600 also allows the field personnel 140 to identify any required follow-up actions with respect to the project.

In certain embodiments, when the post-deployment portal 115 has completed gathering information, a project customer satisfaction survey can be sent to the customer 130 (e.g., automatically via email). In yet other embodiments, the customer 130 can complete the survey through access to the client portal 110. In certain embodiments, a completion notice can also be sent to the manager module 117 and/or the services manager 125 when the customer 130 completes the survey. In yet further embodiments, through the automation of customer satisfaction analysis, post-deployment, the following advantages can be achieved: (1) days sales outstanding (DSO) is reduced as the account receivables department has access to verification that projects were successfully concluded; and (2) support tap out rates for maintenance can be reduced as a complete deployment history regarding the project is accessible to the service provider.

As will be appreciated, FIGS. 2-6 present examples of pages that may be used throughout a professional services automation process and should not be used to limit the scope of the disclosure. Rather, in other embodiments, other or additional pages or means for gathering or displaying data can be used to collect or display more or less data than what is shown in FIGS. 2-6.

Figure 7:
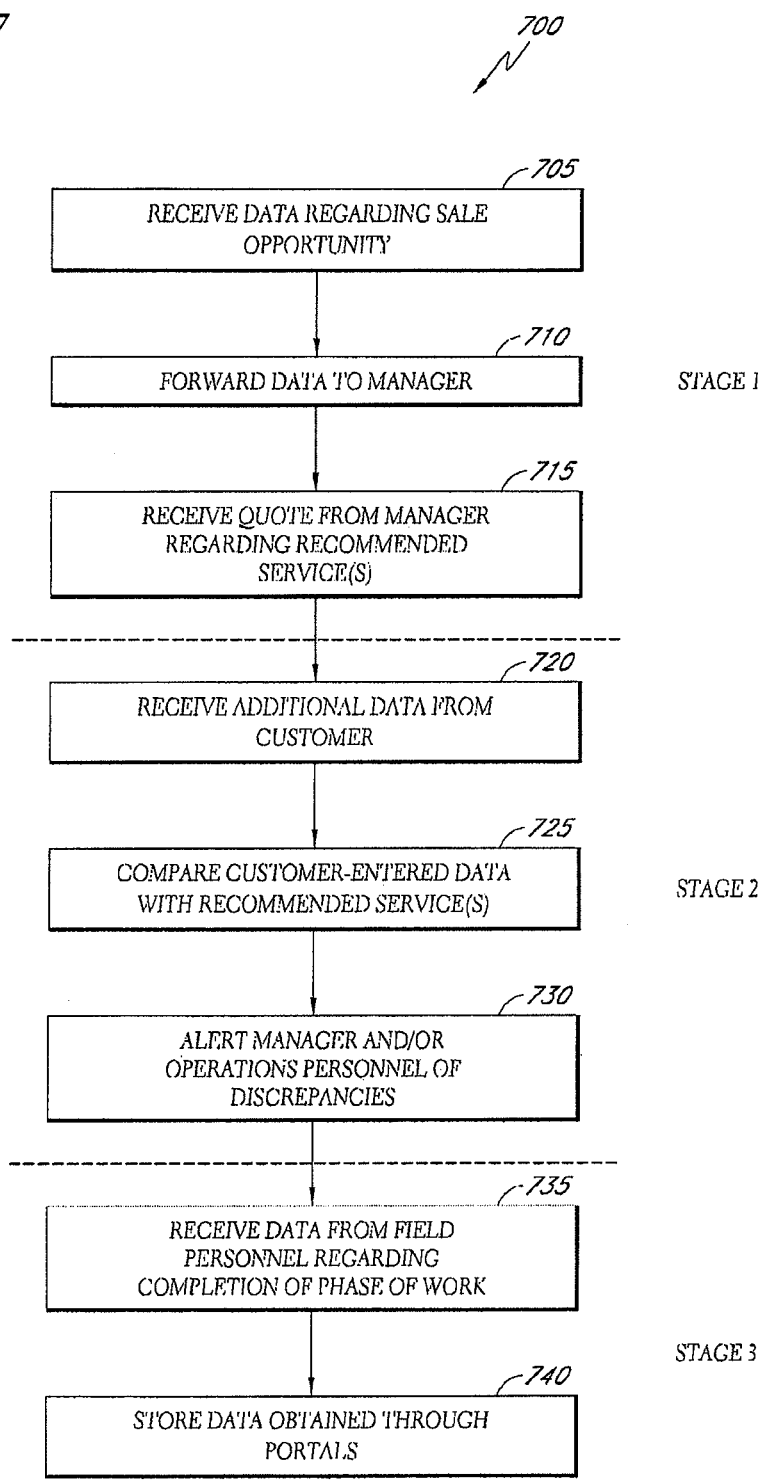
FIGS. 7 and 8 illustrate flowcharts of exemplary embodiments of workflow automation processes usable with the workflow automation environment of FIG. 1.

FIG. 7 illustrates a flowchart of a workflow automation process 700 usable with the workflow automation environment 100 of FIG. 1, according to certain embodiments of the invention. In certain embodiments, the process 700 can be used by a professional services provider to generate a comprehensive history of a project's lifecycle. Moreover, the process 700 advantageously utilizes means for obtaining customer input prior to the post-sale deployment of professional services.

As illustrated in FIG. 7, the workflow automation process 700 is divided into three stages. In general, Stage 1 includes receiving and analyzing data to set up or scope a particular project based on product environment information received from the customer's site. Stage 2 comprises comparing what services are recommended based on data from Stage 1 and what the customer expects as define in data received directly from the customer. Stage 2 further comprises presenting to professional services management personnel relevant issues for analysis and review as automatically identified based on the above-described comparison and any additional information received from the customer. Finally, Stage 2 provides the customer with an opportunity to validate the data obtained in Stage 1. Stage 3 represents the closure, or completion, of the project and provides a narrative of the deployment. This third stage can also be used to account for any issues associated with the project that would impact revenue through loss of recognition capability or dragging customer satisfaction issues. In certain embodiments, access to information gathered in this stage can also be provided to financial personnel to perform, for example, an audit of completed work to validate services revenue.

For ease of explanation, the workflow automation process 700 will be described with reference to the modules of the workflow automation environment 100 of FIG. 1. In particular, the workflow automation process 700 begins at Block 705, wherein the pre-sales portal 105 receives data regarding a sale opportunity. For instance, the data can be collected by sales personnel 120 at a potential customer's site and input and/or transmitted to the pre-sales portal 105. In certain embodiments, this data advantageously includes information regarding the customer's product environment, as is discussed in more detail above.

At Block 710, the data is forwarded to the manager module 117 and/or the services manager 125. For instance, the data can be used to populate one or more records 119 maintained by the manager module 117. After analyzing the data, a quote for recommended services is generated based on the customer's product environment (Block 715).

At Block 720, the client portal 110 provides the customer 130 with an opportunity to review the record(s) 119 based on the data input by the sales personnel 120 and to receive additional data and/or comments from the customer 130 (Block 720). At Block 725, the manager module 117 compares the customer data with the recommended services and alerts the services manager 125 or other professional services personnel 135 of any discrepancies (Block 730).

Once the recommended services are inline with the customer's expectations, the appropriate project description (e.g., Statement of Work, work breakdown) is finalized and field personnel 140 are deployed to the customer site to perform the professional services. At Block 735, the post-deployment portal 115 receives data from the field personnel 140 regarding the completion of a phase of work. This data is then forwarded to the manager module 117 for updating the appropriate record(s) 119 (Block 740). This stored data obtained through each of the portals is then advantageously available for future reference and analysis to improve the delivery of subsequent professional services.

Figure 8:
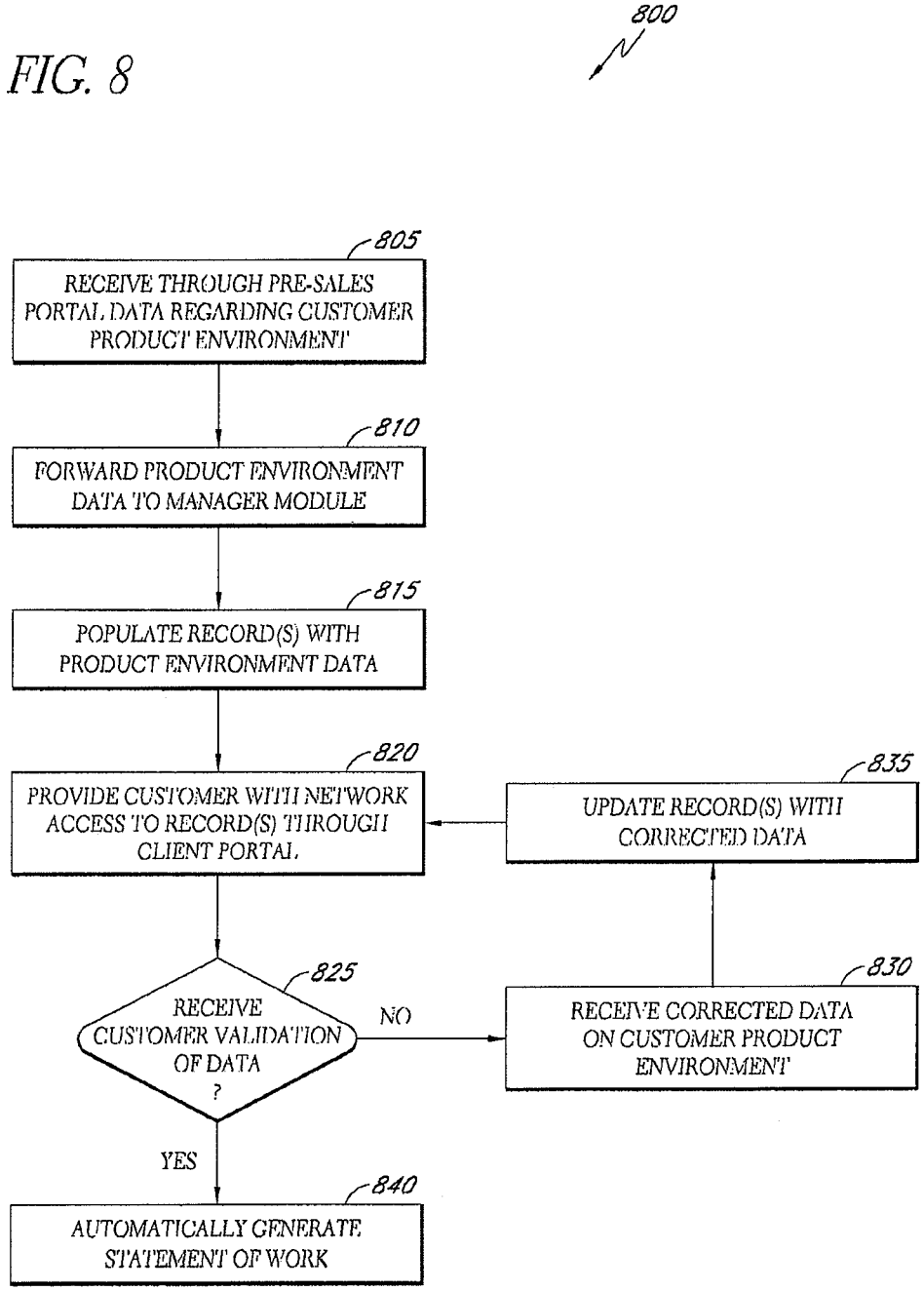

FIG. 8 illustrates another embodiment of a workflow automation process 800 that provides for customer validation of pre-sales efforts prior to post-sales deployment of professional services. For ease of explanation, the workflow automation process 800 will be described with reference to the modules of the workflow automation environment 100 of FIG. 1.

The process 800 begins with Block 805, wherein the pre-sales portal 105 receives data regarding a customer product environment and/or services requirements. For instance, in a data management environment, such data can be input by sales personnel 120 of a professional services provider and relate to, for example, the type of storage being performed (e.g., backup, replication, archive), the types and amount of storage media, the number of computers or servers, the amount of data involved, available recovery systems, combinations of the same or the like.

At Block 810, the pre-sales portal 105 forwards the product environment data to the manager module 117, which populates one or more records 119 (Block 815). At Block 820, the workflow automation system 100 provides the customer 130 with access to the record(s) 119 through the client portal 110. For instance, the workflow automation system 102 (e.g., the client portal 110 or the manager module 117) can provide a URL address to the customer 130, which allows the customer access, such as secure access, to the appropriate record(s) 119. At this point, the customer 130 is prompted to review the product environment data input by the pre-sales personnel 120 for accuracy and/or completeness. Also, the customer portal 110 may prompt the customer 130 for additional details regarding the client's product work environment and/or professional services requirements.

If the customer does not validate the data (Block 825), the client portal 110 receives corrected and/or additional data concerning the product environment through the client portal 110 (Block 830). The manager module 117 then updates the appropriate record(s) 119 with the corrected and/or additional data (Block 835). After updating the records, the process 800 returns to Block 820 to provide the customer access to the updated record(s) 119.

In certain embodiments, if the customer 130 fails to respond to the workflow automation system 102 request for validation (Block 820) in a timely manner, the manager module 117 can alert the professional services operations personnel 135. Professional services operations personnel 135 can then proactively use the manager module 117 to automatically generate a reminder notification, which is automatically transmitted to the customer 130 to assist in resuming the workflow automation process 100.

If at Block 825 the customer validates the data representing its product environment, the manager module 117 and/or manager 125 generates a Statement of Work or like project description, which can be followed by a deployment of corresponding professional services. Thus, the process 800 provides that the generated Statement of Work or like project description is based on a customer-validated description of the applicable project environment.

Although the workflow automation processes 700 and 800 have been described with reference to particular arrangements, it will be understood from the disclosure herein that other embodiments of the processes 700, 800 can vary from the flowcharts depicted in FIGS. 7 and 8. For example, in certain embodiments, the workflow automation process 700 further automatically generate one or more Statements of Work, task workflows, work breakdown structure, statement of task or other project descriptions that are reviewed and validated by the client prior to being sent to the services manager 125 for approval and execution.

Moreover, in certain embodiments, the data collected through the portals 105, 110 and 115 regarding the delivery of services can be maintained in a searchable repository, such as one or more databases, post deployment. Such data can be later used in assisting professional services and/or customer support organizations to better manage relevant details associated with each deployment's successes and/or issues. Moreover, the stored data can also be mined by the professional services provider for reference information and additional sales opportunities.

In certain embodiments, the history of the completed project, as collected through each of the portals 105, 110, 115 provides data points that can be used to scope other projects of a similar nature within certain regions or geographies. Such embodiments can be advantageously used to further create a more extensible services organization through information sharing.

For instance, the data collected through portals 105, 110, 115 can further be used to form a knowledge base identifying projects as "successful" or "unsuccessful." Such information can be later accessed by the services provider to streamline its offerings, focusing on those deployments that generate the largest degree of success and scale. This information can also be used by sales personnel to compile lists of customers, through the contemporaneous capture of detail about each completed project, that may function as references for new sales.

Although certain embodiments of the invention have been disclosed, it is contemplated that other embodiments of workflow automation systems can also be used without departing from the scope or spirit of the disclosure. For example, in certain embodiments of the invention, the workflow automation system 102 can provide a series of logical gates associated with "inbound" services opportunities, logically separating these opportunities into two categories: (1) staff augmentation services (e.g., services that do not require a Statement of Work, advanced design validation and/or specific risk analysis to ensure the success of services delivery); and (2) project-based services (e.g., services that generally require advanced analysis of the opportunity to ensure that the project is delivered in a manner that is deemed successful to the end user recipient of the services).

Systems and modules described herein can comprise software, firmware, hardware, or any combination(s) of software, firmware, or hardware suitable for the purposes described herein. Software and other modules can reside on servers, workstations, personal computers, computerized tablets, PDAs, and other devices suitable for the purposes described herein. Software and other modules can be accessible via local memory, via a network, via a browser, or via other means suitable for the purposes described herein. Data structures described herein can comprise computer files, variables, programming arrays, programming structures, or any electronic information storage schemes or methods, or any combinations thereof, suitable for the purposes described herein. User interface elements described herein can comprise elements from graphical user interfaces, command line interfaces, and other interfaces suitable for the purposes described herein.

Embodiments of the invention are also described above with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions can also be stored in a computer-readable memory that can direct a computer or other programmable data processing apparatus to operate in a particular manner, such that the instructions stored in the computer-readable memory produce an article of manufacture including instruction means that implement the acts specified in the flowchart and/or block diagram block or blocks. The computer program instructions can also be loaded onto a computer or other programmable data processing apparatus to cause a series of operations to be performed on the computer or other programmable apparatus to produce a computer-implemented process such that the instructions that execute on the computer or other programmable apparatus provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein can be embodied in a variety of other forms; furthermore, various omissions, substitutions and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A computer system that provides customer-validated Statement of Work workflow automation for data storage environments, the computer system comprising:
    computer hardware comprising one or more computer processors;
    a first user interface executing in the one or more computer processors, the first user interface configured to receive first data indicative of a storage architecture of a first data storage system, the first data comprising at least first storage configuration information, customer storage media type preference, an amount of available storage components, and recommendations by the service provider for modifying the first data storage system, the first data input by a service provider;
    a second user interface executing on one or more computer processors, the second user interface configured to display the first data and the recommendations for modifying the first data storage system for review by the customer, the second user interface being further configured to receive from the customer second data comprising second storage configuration information about the first data storage system, expectations about the modifications to the first data storage system, and validation input regarding the data storage system environment;
    a manager module executing on the one or more computer processors, the manager module further configured to:
        automatically compare the first configuration information about the first data system input by the first service provider with the second storage configuration information input by the customer,
        automatically compare the recommendations input by the service provider with the expectations input by the customer,
        automatically alert a services manager with any discrepancies associated with the comparing of the first storage configuration information with the second storage configuration information and any discrepancies associated with the comparing of the recommendations with the expectations;
    after a service manager or professional services personnel resolve any discrepancies, the manager module further configured to generate, based at least on the first data and the validation input, a customer-validated Statement of Work to be performed with respect to the project related to the first data storage system; and
    a third user interface configured to receive completion data regarding completion of the services performed with respect to the first data storage system after the customer has accepted the proposed project Statement of Work.

2. The computer system of claim 1, wherein at least one of the first and second user interfaces comprises a web-based interface.

3. The computer system of claim 1, wherein the first, second and third user interfaces operate on a single server.

4. The computer system of claim 1, wherein the manager module is further configured to identify one or more aspects of the first data storage system needing additional description from the customer.

5. The computer system of claim 1, additionally comprising completion data regarding the performance of the one or more recommended services.

6. The computer system of claim 1, additionally comprising one or more computer processors that are configured to generate a report after completion of the project.

7. The computer system of claim 1, additionally comprising obtaining a survey from the customer upon completion of the project.

8. A method that provides customer-validated Statement of Work workflow automation for data storage environments, the method comprising:
    receiving first data with a first user interface executing on computer hardware comprising one or more computer processors, the first data indicative of a storage architecture of a first data storage system, the first data comprising at least first storage configuration information, customer storage media type preference, an amount of available storage components, and recommendations by the service provider for modifying the first data storage system, the first data input by a service provider;
    displaying on a second user interface, the first data and the recommendations for modifying the first data storage system to the customer;
    receiving from the customer second data, with the second user interface executing on one or more computer processors, the second data comprising second storage configuration information about the first data storage system, expectations about the modifications to the first data storage system, and validation input regarding the data storage system environment;

automatically comparing, by computer hardware comprising one or more computer processors, the first configuration information about the first data system input by the first service provider with the second storage configuration information input by the customer, automatically comparing, by computer hardware comprising one or more computer processors, the recommendations input by the service provider with the expectations input by the customer, automatically alerting, by computer hardware comprising one or more computer processors, a services manager with any discrepancies associated with the comparing of the first storage configuration information with the second storage configuration information and any discrepancies associated with the of the recommendations with the expectations;

after a service manager or professional services personnel resolves any discrepancies, generating, based at least on the first data and the validation input, a customer-validated Statement of Work to be performed with respect to the project related to the first data storage system; and a third user interface configured to receive completion data regarding completion of the services performed with respect to the first data storage system after the customer has accepted the proposed project Statement of Work.

9. The method of claim 8, wherein at least one of the first and second user interface comprises a web-based interface.

10. The method of claim 8, wherein the first, second and third user interfaces operate on a single server.

11. The method of claim 8, further comprising identifying one or more aspects of the first data storage system needing additional description from the customer.

12. The method of claim 8, additionally comprising obtaining completion data regarding the performance of the one or more recommended services.

13. The method of claim 8, additionally comprising generating a report after completion of the project.

14. The method of claim 8, additionally comprising obtaining a survey from the customer upon completion of the project.

* * * * *

UNITED STATES PATENT AND TRADEMARK OFFICE
CERTIFICATE OF CORRECTION

| | | |
|---|---|---|
| PATENT NO. | : 8,799,051 B2 | Page 1 of 1 |
| APPLICATION NO. | : 13/854391 | |
| DATED | : August 5, 2014 | |
| INVENTOR(S) | : Robert Keith Brower, Jr. et al. | |

It is certified that error appears in the above-identified patent and that said Letters Patent is hereby corrected as shown below:

Title Page

In the right column on page 1, item 56, at line 12, Under Other Publications, Change "Inlelligence." to --Intelligence.--.

In the right column on page 5, item 56, at line 14, Under Other Publications, Change "Mangement" to --Management--.

In the Specification

In column 5 at line 41 (approx.), Change "and or" to --and/or--.

In column 6 at line 36, Change "deployment)" to --deployment).--.

In the Claims

In column 19 at line 19, In Claim 8, after "the" insert --comparing--.

Signed and Sealed this
Twenty-sixth Day of May, 2015

Michelle K. Lee
*Director of the United States Patent and Trademark Office*